United States Patent [19]

Holmes et al.

[11] 3,915,995

[45] Oct. 28, 1975

[54] PRODUCTION OF 2,2-DISUBSTITUTED PROPIOLACTONES

[75] Inventors: Jerry D. Holmes; Hugh J. Hagemeyer, Jr., both of Longview, Tex.

[73] Assignee: Eastman Kodak Company, Rochester, N.Y.

[22] Filed: Nov. 3, 1972

[21] Appl. No.: 303,569

[52] U.S. Cl. .............................................. 260/343.9
[51] Int. Cl.² ...................................... C07D 305/12
[58] Field of Search .............................. 260/343.9

[56] References Cited
UNITED STATES PATENTS

| | | | |
|---|---|---|---|
| 2,462,357 | 2/1949 | Caldwell et al. | 260/343.9 |
| 2,466,420 | 4/1949 | Hagemeyer | 260/343.9 |
| 2,469,690 | 4/1946 | Hagemeyer et al. | 260/343.9 |
| 2,580,714 | 1/1952 | Young et al. | 260/343.9 |
| 2,806,064 | 9/1957 | McKlveen | 260/343.9 |
| 3,201,474 | 8/1965 | Hasek et al. | 260/343.9 |
| 3,221,028 | 11/1965 | Nations et al. | 260/343.9 |
| 3,549,660 | 12/1967 | Künstle et al. | 260/343.9 |

OTHER PUBLICATIONS
Weissberger, *Heterocyclic Compounds*, Part II, Interscience Publishers, 1964, pp. 791–793 relied on.

*Primary Examiner*—Donald G. Daus
*Assistant Examiner*—Anne Marie T. Tighe
*Attorney, Agent, or Firm*—Edward R. Weber; Cecil D. Quillen, Jr.

[57] ABSTRACT

The present invention relates to a process for the manufacture of 2,2-disubstituted propiolactones from isoanhydrides and formaldehyde, as shown in the following equation:

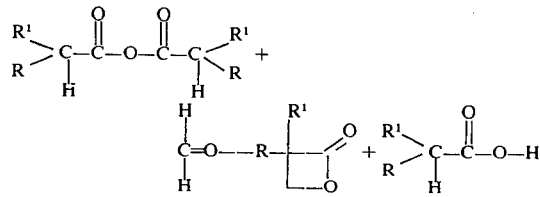

wherein R and R¹ individually may be a straight or branched chain alkyl, aryl or aralkyl groups having 1 to 10 carbon atoms. The reaction is conducted in the presence of an acidic or a basic catalyst at a temperature of from about 190°C. to about 400°C.

26 Claims, No Drawings

PRODUCTION OF 2,2-DISUBSTITUTED PROPIOLACTONES

The present invention relates to a process for preparing 2,2-disubstituted propiolactones by the reaction of an isoanhydride with formaldehyde according to the following formula:

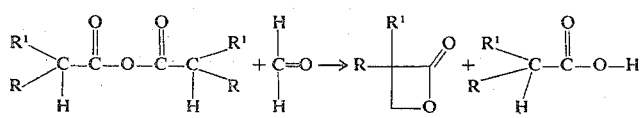

wherein R and $R^1$ individually may be a straight or branched chain alkyl, aryl or aralkyl group of from 1 to 10 carbon atoms, preferably 1 to 6 carbon atoms, at a temperature of from about 190°C. to about 400°C.

2,2-Disubstituted propiolactones are useful in the polymer industry as a starting material for synthetic resins and synthetic fibers. They are also useful in the pharmaceutical industry and have heretofore been prepared by a variety of methods. For example, in U.S. Pat. No. 2,356,459, there is described a well-known method for preparing 2,2-disubstituted propiolactones by the addition reaction of dimethyl ketene and formaldehyde. The known methods for the manufacture of 2,2-disubstituted propiolactones, however, can be practiced on the commercial scale only with difficulties and resultant economic disadvantages.

It is, therefore, an object of our invention to provide a simplified method for the preparation of 2,2-disubstituted propiolactones.

It is another object to provide a one-step method for the preparation of 2,2-disubstituted propiolactones.

Other objects of the invention will become apparent from a consideration of the specification and claims of this application.

The prior literature describes a reaction of primarily aromatic aldehydes with anhydrides to give unsaturated acids. These reactions are normally conducted in the liquid phase using basic catalysts. Aliphatic aldehydes are usually unsuitable for this reaction. In the liquid phase, aldehydes normally react with anhydrides to form gem-diesters. For example, formaldehyde, when reacted with butyric anhydride, normally gives methylene dibutyrate (J. F. Walker, "Formaldehyde", 3rd Ed., ACS Monograph Series No. 152, Reinholt, p. 350). No prior literature is known which describes the condensation of aldehydes with acid anhydrides to produce lactones. It was therefore quite unexpected that formaldehyde could be made to condense in any significant amount with an anhydride to form a 2,2-disubstituted propiolactone.

In the process of the instant invention, an isoanhydride having the formula

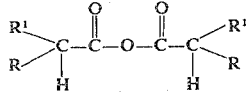

is condensed with formaldehyde to yield a 2,2-disubstituted propiolactone having the formula

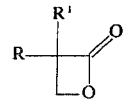

and an organic acid having the formula

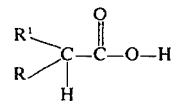

wherein R and $R^1$ individually may be a straight or branched chain alkyl, aryl or aralkyl group of from 1 to 10 carbon atoms, preferably 1 to 6 carbon atoms. The reaction is catalyzed by either an acidic or a basic type of catalyst. Basic type catalysts which may be used include sodium carbonate on a celatom support, sodium carbonate on silica gel, sodium bicarbonate on celatom or silica gel, alkali metal salts of carboxylic acids on inert supports, supported alkali metal hydroxides, supported alkaline earth hydroxides, and supported rare earth oxides. Sodium carbonate on a celatom support gives a high conversion of formaldehyde to the substituted propiolactone. Acidic materials which are active catalysts include silica gel, alumina, silica-alumina, phosphoric acid deposited on alumina or silica gel, boric acid deposited on alumina or silica gel, supported halo-phosphoric acid, acidic salts such as boron phosphate and aluminum phosphate, supported Lewis acids such as zinc chloride, ferric chloride, and stannous chloride. As will be appreciated, there are numerous other acidic and basic materials which can be utilized as catalysts in the process.

A silica-alumina catalyst having a surface area of from about 20 to about 200 square meters per gram and a pore diameter of from about 100 to about 250 angstroms is an especially effective catalyst for the process. A particularly effective catalyst is a silica-alumina having a surface area of about 75 to about 125 square meters per gram and a pore diameter of about 120 to about 175 angstroms. Higher surface areas are effective, but give decreasing conversions.

Preferably the temperature of the condensation reaction will be sufficient to insure vaporization of the reactants and the products. Subatmospheric pressure may also be used to facilitate vaporization of the reactants. The process may be operated at temperatures of from about 190°C. to about 400°C. A preferred embodiment utilizing a silica-alumina catalyst as described above gives high conversion and yield when operated in the temperature range of from about 230°C. to about 275°C.

Suitable anhydrides include isobutyric, 2-ethylhexanoic, 2-phenylpropionic, 2-ethylpropionic, 2-ethylbutyric, and 2-methylpentanoic.

Formaldehyde may be fed as a gaseous monomer, as a trioxane solution, or as a paraformaldehyde slurry. It has been found that the aldehyde conversion to lactone is dependent on the amount of anhydride fed. At a 1.15 to 1 ratio of anhydride to aldehyde, over the preferred silica-alumina catalyst, the formaldehyde conversion per pass is 31–35%, whereas at a 5 to 1 ratio the conversion increases to 50–52%. There appears to be no upper limit to this ratio other than practical manufacturing considerations which arise when a large excess of one material is introduced into a system. The reaction may be carried out at atmospheric, subatmospheric, or superatmospheric pressure. When an acidic catalyst is used, the reaction may be conducted at atmospheric pressure utilizing an inert gas sweep. With a basic catalyst, a reduced pressure is found to increase conversion to the substituted propiolactone. If desired, an inert diluent gas may be utilized to facilitate feeding of the reactants, control of contact time, etc. Suitable inert diluent gas is any gas which does not react with either the reactants or the products under the conditions of the reaction, such as $N_2$, argon, helium, gaseous hydrocarbons and compounds which are readily vaporized such as benzene. Reaction time will depend upon the catalyst and temperature utilized, but will normally be in the range of from about 0.5 to about 3 seconds.

The process of the invention is illustrated in greater detail by the following examples, but it will be understood that these examples are not intended to limit the invention in any way, and obvious modifications will occur to those skilled in the art.

EXAMPLE 1

This example illustrates the process of the invention using a silica-alumina catalyst. A 2-foot by 22 mm. glass reactor is charged with 50 ml. of a low surface area (approximately 100 sq.m./g., pore volume 0.34 cc./g., average pore diameter 140–150 angstroms) silica-alumina (Davison Grade 970) and glass chips which are used for preheating. The reactor is heated with an electrical furnace. Nitrogen is fed by a rotameter at a rate of 1.5 moles per hour during the run. The feed is a 5 to 1 molar ratio of isobutyric anhydride to formaldehyde, which is fed as trioxane. In a typical run at 235°–255°C. during a 1-hour period 52 ml. of the feed mixture is pumped through the reactor. This corresponds to a feed of 1.82 grams (0.0607 mole) formaldehyde and 48 grams (0.304 mole) isobutyric anhydride. A liquid reaction product of 49.8 grams is collected and contains 3.1 grams pivalolactone, 41.5 grams isobutyric anhydride, and 5.2 grams isobutyric acid. This corresponds to a 51 percent conversion of formaldehyde to pivalolactone and a 10.2 percent conversion based on anhydride. The yield to pivalolactone based on isobutyric anhydride is 74 percent.

EXAMPLE 2

Using a 2 to 1 molar ratio of isobutyric anhydride to formaldehyde as feed, a low surface area (surface area 80–100 m²/g., pore volume 0.28–0.33 cc./g.) alumina catalyst (Harshaw AL-0104) gives 9.3 percent conversion of formaldehyde to pivalolactone. Isobutyric anhydride yield to pivalolactone is 30 percent. The temperature is maintained at 300°–330°C. All other experimental procedures are as described in Example 1.

EXAMPLE 3

A catalyst consisting of phosphoric acid on low surface area alumina (Harshaw AL-0104) is tested according to the procesure of Example 1 using a 1.15 to 1 molar ratio of isobutyric anhydride to formaldehyde as the feed. The temperature is 240°–260°C. and a nitrogen sweep of 4.6 moles per hour is used. Formaldehyde conversion to combined pivalolactone and isobutyroxypivalic acid is 21 percent. Anhydride yield to the same mixture is 35 percent.

EXAMPLE 4

A catalyst consisting of 5 percent phosphoric acid on silica gel (Davison G-70, surface area 340 sq.m./g., pore volume 1.15 cc./g., average pore diameter 120 angstroms) is tested according to the procedures of Example 1 at 290°–310°C. with nitrogen at 2 moles per hour. Formaldehyde conversion to pivalolactone is 8.5 percent. The anhydride yield is 30 percent.

EXAMPLE 5

This example illustrates the use of a basic catalyst. The catalyst is one percent sodium carbonate on celatom (75 ml.). A top bed of silica-alumina in the preheat section is used to dissociate trioxane which is fed as a 25 percent solution in toluene. Isobutyric anhydride is fed through a dip tube just above the sodium carbonate catalyst and well below the silica-alumina. While feeding the trioxane solution at a rate of 11 ml. per hour and anhydride at 27 ml. per hour under a 50 mm. vacuum at 280°–320°C., the following results are obtained. Formaldehyde conversion to pivalolactone is 27 percent and anhydride conversion to pivalolactone is 14 percent with a 44 percent yield.

EXAMPLE 6

Using a system as described in Example 5 except with no vacuum, a 50 ml. bed of silica gel (Davison G-70) is tested. Conversion of formaldehyde to pivalolactone is 12 percent. Anhydride yield is 36 percent.

EXAMPLE 7

This example illustrates the process with anhydrides other than isobutyric. Formaldehyde is reacted with 2-ethylhexanoic anhydride over a silica-alumina catalyst at ratios and conditions as described in Example 1. The only difference is that the pressure is reduced sufficiently to effect vaporization of the reactants. 2-Butyl-2-ethylpropiolactone is obtained.

EXAMPLE 8

When 2-phenylpropionic anhydride is reacted with formaldehyde at conditions as described in Example 7, 2-methyl-2-phenylpropiolactone is obtained.

The invention has been described in detail with particular reference to preferred embodiments thereof, but it will be understood that variations and modifications can be effected within the spirit and scope of the invention as described hereinabove.

We claim:

1. A vapor phase process for producing 2,2-disubstituted propiolactone having the formula

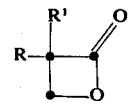

whereby an isoanhydride having the formula

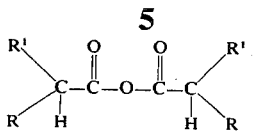

wherein R and R¹ individually is straight or branched chain alkyl having 1 to 10 carbon atoms, is reacted with formaldehyde or a formaldehyde-yielding material in the presence of a catalyst selected from the group consisting of sodium carbonate on a celatom support, sodium carbonate on silica gel, sodium bicarbonate on celatom or silica gel, alkali metal salts of carboxylic acids on inert supports, alkali metal hydroxides on inert supports, alkaline earth hydroxides on inert supports, and rare earth oxides on inert supports, at a temperature of from about 190°C. to about 400°C.

2. The process of claim 1 wherein R and R¹ individually is straight or branched chain alkyl having 1 to 6 carbon atoms.

3. The process of claim 1 wherein the isoanhydride is selected from the group consisting of isobutyric anhydride, 2-ethylhexanoic anhydride, 2-phenylpropionic anhydride.

4. The process of claim 1 wherein the reaction is conducted at a temperature of from about 230°C. to about 275°C.

5. The process of claim 1 wherein the reaction is conducted at atmospheric pressure.

6. The process of claim 1 wherein the process is conducted at a reduced pressure.

7. The process of claim 1 wherein the ratio of anhydride fed to aldehyde is from about 1.15 to 1 to about 5 to 1.

8. A vapor phase process for producing 2,2-disubstituted propiolactone having the formula

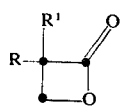

whereby an isoanhydride having the formula

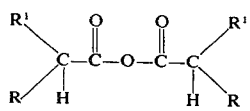

wherein R and R¹ individually is a straight or branched chain alkyl having 1 to 10 carbon atoms, is reacted with formaldehyde or a formaldehyde-yielding material in the presence of a catalyst selected from the group consisting of silica gel, alumina, silica-alumina, phosphoric acid deposited on alumina or silica gel, boric acid deposited on alumina or silica gel, halo-phosphoric acids on inert supports, boron phosphate and aluminum phosphate, zinc chloride and ferric chloride, at a temperature of from about 190°C. to about 400°C.

9. The process of claim 8 wherein the catalyst consists of silica-alumina having a surface area of from about 20 square meters per gram to about 200 square meters per gram, and pore diameter from about 100 angstroms to about 250 angstroms.

10. The process of claim 8 wherein R and R¹ individually is straight or branched chain alkyl having 1 to 6 carbon atoms.

11. The process of claim 8 wherein the isoanhydride is selected from the group consisting of isobutyric anhydride, 2-ethylhexanoic anhydride, 2-phenylpropionic anhydride.

12. The process of claim 8 wherein the reaction is conducted at a temperature of from about 230°C. to about 275°C.

13. The process of claim 8 wherein the reaction is conducted at atmospheric pressure.

14. The process of claim 8 wherein the process is conducted at a reduced pressure.

15. The process of claim 8 wherein the ratio of anhydride fed to aldehyde is from about 1.15 to 1 to about 5 to 1.

16. A vapor phase process for producing pivalo-lactone whereby isobutyric anhydride is reacted with formaldehyde or a formaldehyde-yielding material in the presence of a catalyst selected from the group consisting of sodium carbonate on a celatom support, sodium carbonate on silica gel, sodium bicarbonate on celatom or silica gel, alkali metal salts of carboxylic acids on inert supports, alkali metal hydroxides on inert supports, alkaline earth hydroxides on inert supports, and rare earth oxides on inert supports, at a temperature of from about 190°C. to about 400°C.

17. The process of claim 16 wherein the reaction is conducted at a temperature of from about 230°C. to about 275°C.

18. The process of claim 16 wherein the reaction is conducted at atmospheric pressure.

19. The process of claim 16 wherein the process is conducted at a reduced pressure.

20. The process of claim 16 wherein the ratio of anhydride fed to aldehyde is from about 1.15 to 1 to about 5 to 1.

21. A vapor phase process for producing pivalo-lactone whereby isobutyric anhydride is reacted with formaldehyde or a formaldehyde-yielding material in the presence of a catalyst selected from the group consisting of silica gel, alumina, silica-alumina, phosphoric acid deposited on alumina or silica gel, boric acid deposited on alumina or silica gel, halo-phosphoric acids on inert supports, boron phosphate and aluminum phosphate, zinc chloride and ferric chloride, at a temperature of from about 190°C. to about 400°C.

22. The process of claim 21 wherein the catalyst consists of silica-alumina having a surface area of from about 20 square meters per gram to about 200 square meters per gram, and pore diameter from about 100 angstroms to about 250 angstroms.

23. The process of claim 21 wherein the reaction is conducted at a temperature of from about 230°C. to about 275°C.

24. The process of claim 21 wherein the reaction is conducted at atmospheric pressure.

25. The process of claim 21 wherein the process is conducted at a reduced pressure.

26. The process of claim 21 wherein the ratio of anhydride fed to aldehyde is from about 1.15 to 1 to about 5 to 1.

* * * * *